United States Patent [19]

Isawa

[11] Patent Number: 5,324,910
[45] Date of Patent: Jun. 28, 1994

[54] WELDING METHOD OF ALUMINUM FOIL

[75] Inventor: Ryoji Isawa, Mitaka, Japan

[73] Assignee: Seiwa Mfg. Co., Ltd., Tokyo, Japan

[21] Appl. No.: 936,278

[22] Filed: Aug. 28, 1992

[30] Foreign Application Priority Data

Dec. 27, 1991 [JP] Japan .............................. 3-346888

[51] Int. Cl.$^5$ ...................... B23K 11/11; B23K 11/16
[52] U.S. Cl. .................................... 219/118; 219/56.1
[58] Field of Search ................. 219/118, 86.9, 117.1,
219/56.1, 56.21, 56.22, 58

[56] References Cited

U.S. PATENT DOCUMENTS

| | | | |
|---|---|---|---|
| 3,263,059 | 7/1966 | Rzant | 219/56 |
| 3,495,068 | 2/1970 | Helms | 219/117.1 |
| 3,666,913 | 5/1972 | Haefling et al. | 219/118 |
| 3,944,777 | 3/1976 | Porat | 219/118 |
| 4,048,463 | 9/1977 | Bennett et al. | 219/118 |
| 4,171,477 | 10/1979 | Funari | 219/56.21 |
| 4,546,229 | 10/1985 | Leone | 219/118 |
| 4,633,054 | 12/1986 | Patrick et al. | 219/118 |

FOREIGN PATENT DOCUMENTS

| | | | |
|---|---|---|---|
| 38-26756 | 12/1963 | Japan | 219/118 |
| 57-37429 | 8/1982 | Japan | 219/118 |
| 59-179279 | 10/1984 | Japan | 219/118 |

Primary Examiner—Geoffrey S. Evans
Attorney, Agent, or Firm—Paul A. Guss

[57] ABSTRACT

A welding method of an aluminum foil, which permits the direct resistance welding of an aluminum foil, with a chemical conversion coated layer of $Al_2O_3$ formed thereon, to a lead wire, includes placing an aluminum foil, with a chemical conversion coated layer formed on the surface thereof, on a back bar made of a material having good electrical insulating property and heat resistance, arranging an electrically-conductive metal on the aluminum foil, bring first and second electrode tips into contact under pressure with the surface of the electrically-conductive metal with the electrode tips spaced from each other and then causing a welding current to flow between the first and second electrode tips, thereby conducting the series resistance welding of the aluminum foil to the electrically-conductive metal.

10 Claims, 4 Drawing Sheets

WELDING METHOD OF ALUMINUM FOIL

BACKGROUND OF THE INVENTION

1. Field of the Invention

The present invention relates to a welding method of an aluminum foil, and specifically to a welding method of an aluminum foil used in an aluminum electrolytic capacitor.

2. Description of the Related Art

In aluminum electrolytic capacitors, a chemical conversion coated layer of $Al_2O_3$, which serves as a dielectric, is formed on the surface of an aluminum foil. In such an electrolytic capacitor, a lead wire such as a CP wire is connected to the aluminum foil in order to electrically connect the capacitor to the outside.

The connection of the aluminum foil to the lead wire has heretofore been conducted by a method illustrated in FIG. 4. Namely, an aluminum tab 43 provided on a free end of a lead wire 42 such as a CP wire has been connected to an aluminum foil 41 by rivets 44.

As described above, the lead wire has heretofore been connected to the aluminum foil through the aluminum tab. However, it is needless to say that the direct connection of the lead wire to the aluminum foil without using such a tab is preferred, if possible, from the viewpoints of reduction in the number of processes and the number of parts, and the like. However, it has hitherto been impossible for the following reason to directly connect the lead wire to the aluminum foil.

Namely, in order to conduct the resistance welding of a lead wire to an aluminum foil, it is necessary to place an aluminum foil 41 on a lower electrode 51 made of copper, arrange a lead wire 42 on the aluminum foil 41 and then bring an upper electrode tip 52 into contact under pressure with the lead wire 42 at a proper position so as to cause a welding current to flow between the upper electrode tip 52 and the copper-made lower electrode 51 as illustrated in FIG. 5. However, since a chemical conversion coated layer 45 of $Al_2O_3$ has been formed to a thickness of about 0.1 $\mu m$–10 $\mu m$ on both sides of the aluminum foil 41, and it has a high electric resistance, it has been impossible to cause the welding current to flow between the upper electrode tip 52 and the copper-made lower electrode 51 under the usual conditions for resistance welding, resulting in a failure to directly weld the aluminum foil 41 to the lead wire 42.

SUMMARY OF THE INVENTION

It is thus a generic object of the present invention to provide a welding method of an aluminum foil, which permits the direct resistance welding of an aluminum foil, with a chemical conversion coated layer of $Al_2O_3$ formed thereon, to a lead wire.

In an aspect of this invention under the generic object, there is provided a method of welding an aluminum foil, which comprises placing an aluminum foil, with a chemical conversion coated layer formed on the surface thereof, on a back bar made of a material having good electrical insulating property and heat resistance, arranging an electrically-conductive metal on the aluminum foil, bring first and second electrode tips into contact under pressure with the surface of the electrically-conductive metal with the electrode tips spaced from each other and then causing a welding current to flow between the first and second electrode tips, thereby conducting the series resistance welding of the aluminum foil to the electrically-conductive metal.

In another aspect of this invention, there is provided the welding method wherein the material having good electrical insulating property and heat resistance is composed of a ceramic or a metal whose surface has been subjected to a nitriding treatment.

In a further aspect of this invention, there is provided the welding method wherein the electrically-conductive metal is composed of iron (Fe) as a core and copper (Cu) coated on the surface thereof.

In still a further aspect of this invention, there is provided the welding method wherein the electrically-conductive metal is composed of iron (Fe) as a core and nickel (Ni) coated on the surface thereof.

In yet still a further aspect of this invention, there is provided the welding method wherein the electrically-conductive metal comprises further an alloy of tin (Sn) and lead (Pb), which has been coated on the copper or nickel surface.

Other objects and advantages of the present invention will be readily appreciated from the preferred embodiments of this invention, which will be described subsequently in detail with reference to the accompanying drawings.

DETAILED DESCRIPTION OF THE PREFERRED EMBODIMENTS

Figure 1:
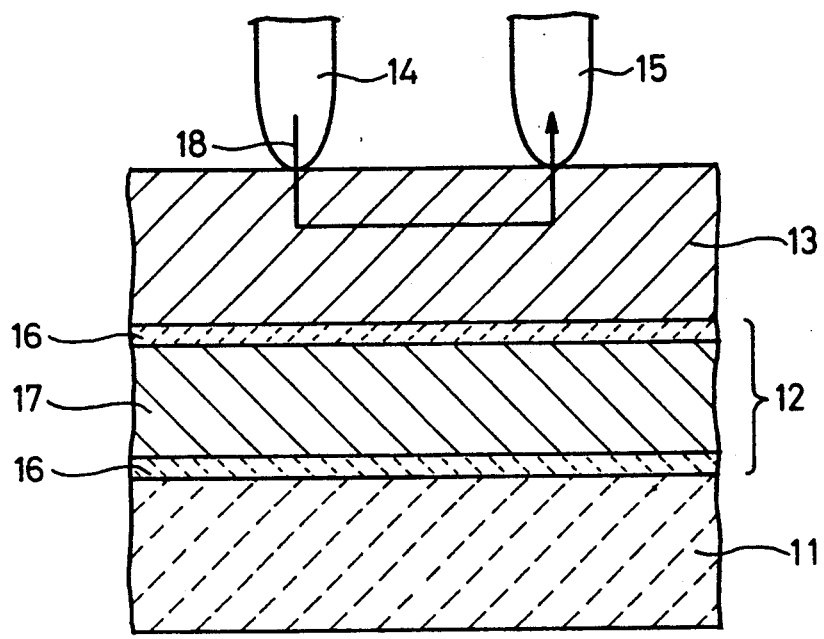
FIG. 1 is a cross-sectional view illustrating a welding method according to the first embodiment of the present invention.

FIG. 1 illustrates a welding method according to the first embodiment of the present invention. Referring now to FIG. 1, according to the first embodiment, an aluminum foil 12 is placed on a back bar 11 composed of a material having good electrical insulating property and heat resistance such as a ceramic, and an electrically-conductive metal 13 is arranged on this aluminum foil 12. In the aluminum foil 12, a chemical conversion coated layer 16 has been formed on both sides of an aluminum layer 17. Electrode tips 14, 15 are brought into contact under pressure with the electrically-conductive metal 13. When a welding current 18 is caused to flow between the electrode tips 14, 15, the welding current 18 flows through the electrically-conductive metal 13 without flowing into the aluminum foil 12 because the chemical conversion coated layer 16 has been formed on both sides of the aluminum foil 12, so that the metal 13 is first heated and then, the aluminum foil 12 is also heated by the heat thus generated. In the present embodiment, since the back bar 11 composed of the material having good electrical insulating property and heat resistance is arranged under the aluminum foil 12, the heat generated is kept availably. Accordingly, the aluminum foil 12 also becomes heated by the electric heating of the electrically-conductive metal 13 placed on the aluminum foil 12 even if the welding current is not caused to directly flow into the aluminum foil 12, so that the electrically-conductive metal 13 welds to the aluminum foil 12.

Figure 2:
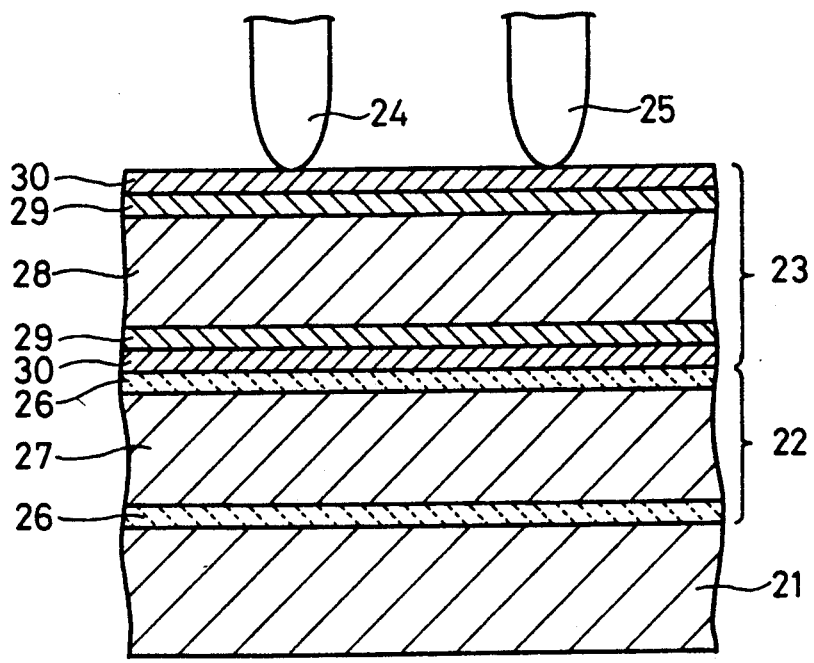
FIG. 2 is a cross-sectional view illustrating a welding method according to the second embodiment of the present invention.

FIG. 2 illustrates a welding method according to the second embodiment of the present invention. Referring now to FIG. 2, an aluminum foil 22 is placed on a back bar 21 made of a ceramic, a CP wire 23 serving as a lead wire is arranged on the aluminum foil 22, and electrode tips 24, 25 are brought into contact under pressure with the surface of the CP wire 23.

Figure 3A:
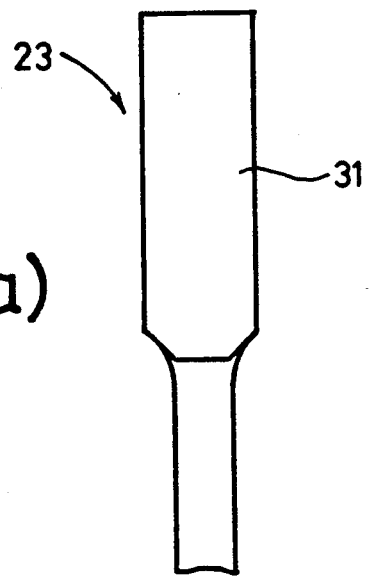
FIGS. 3(a) and 3(b) are a front elevational view and a side elevational view, respectively, which illustrates a CP wire used in the embodiment of the present invention.
Figure 3B:
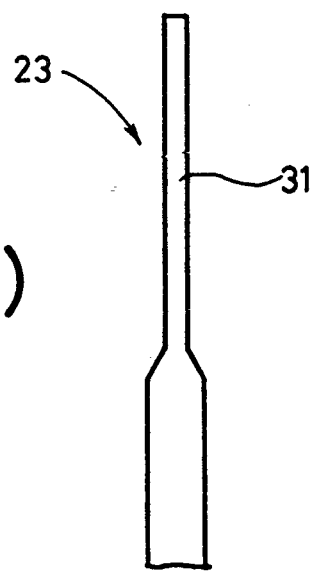
Figure 4:
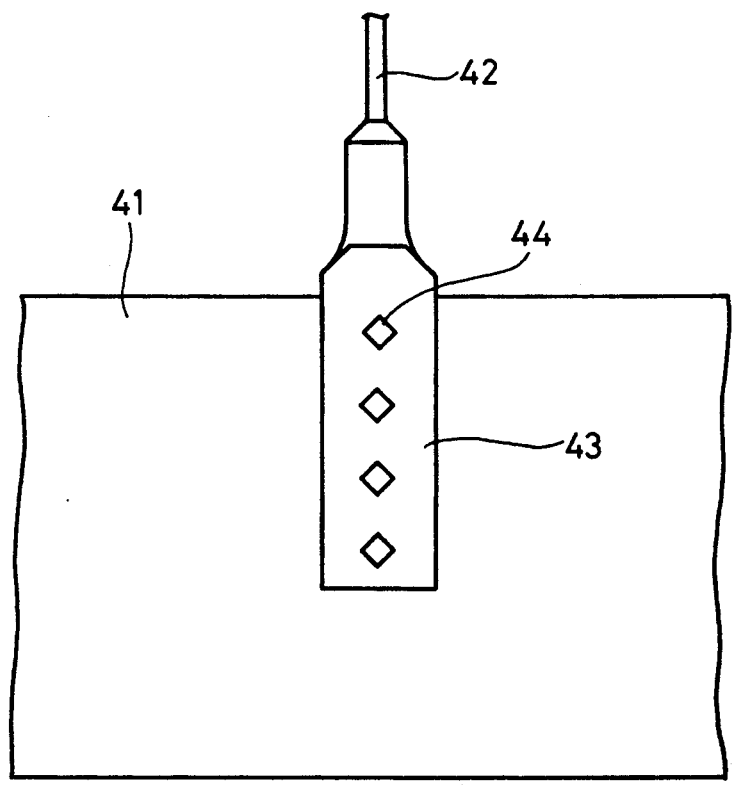
FIG. 4 illustrates a conventional method of connecting a lead wire to an aluminum electrolytic capacitor.
Figure 5:
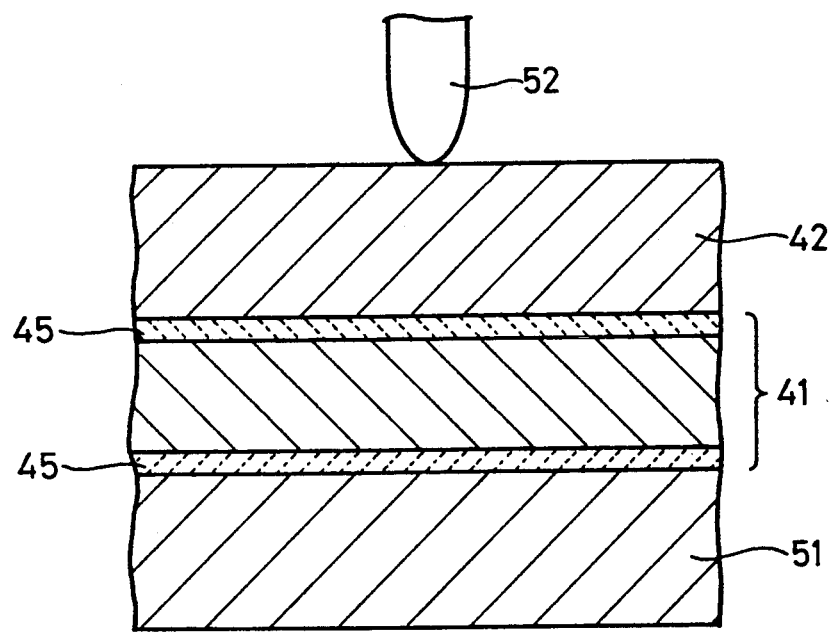
FIG. 5 illustrates a conventional welding method.

The back bar 21 is made of silicon oxide. The film thickness of an aluminum layer 27 inside the aluminum foil 22 is 20 μm. A chemical conversion coated layer of $Al_2O_3$ has been formed to a thickness of 300 Å on both sides of the aluminum layer 27. The CP wire 23 has a diameter of 0.5 mm, and as illustrated in FIGS. 3(a) and 3(b), its free end has been pressed over 3 mm to form a flat header 31 having a thickness of 0.2 mm before its use. The core of the CP wire is Fe 28. A Cu coat 29 has been provided on the surface of Fe 28, and a Sn.Pb layer 30 has been further provided on the Cu coat 29.

The electrode tips 24, 25 used was made of Cu.Cr and in the form of a wedge 3 mm across, and the size of their tip parts was 0.5×1.5 min. An interval between the electrode tip 24 and the electrode tip 25 was 1.5 mm. A pressure applied to the electrode tips 24, 25 was 13.5 kgf/2 tips. A voltage applied to the electrode tips 24, 25 was 2 V, an electric current was 0.78 kA, and a welding time was 1.3 msec.

Under the above-described conditions, resistance welding was carried out. As a result, the aluminum foil 22 welded firmly to the CP wire 23. Namely, as a result of a peel test after the welding, a hole of substantially the same area as the header 31 of the CP wire 23 was bored in the aluminum foil 22. Alternatively, the aluminum foil 22 was torn and broken. Further, as a result of a tensile test, base breaking, in which the aluminum foil 22 was broken in the middle of a tensile point, occurred.

Under the above conditions, the Sn.Pb layer 30 which was a surface layer of the CP wire 23 was pressed out at portions underneath the electrode tips 24, 25 by the pressure and heat subjected upon the welding. However, when the electric current was reduced to 300 Å or lower, and more specifically, the pressure applied to the electrode tips 24, 25, voltage applied to the electrode tips 24, 25, electric current and welding time were controlled to 7 kgf/2 tips, 1.25 V, 0.38 kA and 1.3 msec., respectively, the Sn.Pb layer 30 was also successfully retained underneath the electrode tips 24, 25 even after the welding. If the Cu coat 29 and Fe 28 are exposed, the passive oxide films of Fe and Cu are formed on their surfaces, thereby adversely affecting capacitor properties. However, the formation of these passive oxide films can be prevented by retaining the Sn.Pb layer 30 on their surfaces.

The relationship between the welding current and the welding condition was then investigated. When the welding current was low, it was observed that the chemical conversion coated layer 26 welded to the back surface of the CP wire 23 at the portions underneath the electrode tips 24, 25 when the aluminum foil 22 was peeled off from the CP wire 23 after the welding. When the welding current was made high, it was observed that the chemical conversion coated layer 26 welded to the back surface of the CP wire 23 at not only the portions underneath the electrode tips 24, 25 but also portions between the electrode tips 24, 25. When the welding current was made higher, it was observed that the aluminum layer 27 was fused between the electrode tips 24, 25.

From these facts, it is understood that when the welding current is low, the PC wire 23 is first heated at portions underneath the electrode tips 24, 25 and then heated gradually at portions between the electrode tips 24, 25. When a still higher welding current is caused to flow, the heat generated is fully transmitted to the aluminum layer 27, thereby fusing this layer.

Incidentally, according to the present invention, a lead wire obtained by plating the surface of Fe 28 with Ni can also be welded instead of the CP wire 23.

In the present invention, a material having good electrical insulating property and heat resistance such as a ceramic is used as the back bar,. and a welding current is caused to flow between the first and second electrode tips, thereby conducting resistance welding. Therefore, even if a chemical conversion coating is formed on the surface of an aluminum foil, which is one substance to be welded, the aluminum foil can be welded to an electrically-conductive metal which is the other substance to be welded, and has been placed on the aluminum foil. According to the present invention, as described above, a lead wire such as a CP wire can be directly welded to an aluminum foil with a chemical conversion coated layer formed thereon. Therefore, there is need to use a tab conventionally used for connecting a lead wire to an aluminum electrolytic capacitor.

What is claimed is:

1. A method of welding an aluminum foil having a dielectric layer formed thereon, which comprises the steps of:

depositing a dielectric layer to a predetermined thickness on at least one side of an aluminum foil, said dielectric layer comprising a chemical conversion coated layer deposited on the surface of said aluminum foil;

placing said aluminum foil having said dielectric layer deposited thereon on a back bar made of a heat resistant material having good electrical insulating properties;

placing an electrically conductive-metal on the aluminum foil over said dielectric layer;

bringing first and second electrode tips into contact under pressure with the surface of the electrically-conductive metal, said electrode tips being spaced from each other by a predetermined distance; and causing a welding current to flow between the first and second electrode tips, thereby conducting a series resistance welding of the aluminum foil to the electrically-conductive metal through said dielectric layer.

2. The welding method as claimed in claim 1, wherein said heat resistant material having good electrical insulating properties comprises a ceramic.

3. The welding method as claimed in claim 1, wherein said electrically-conductive metal comprises an iron (Fe) core and a copper (Cu) coating covering the surface of said iron core.

4. The welding method as claimed in claim 1, wherein said electrically-conductive metal comprises an iron (Fe) core and a nickel (Ni) coating covering the surface of said iron core.

5. The welding method as claimed in claim 3, wherein the electrically-conductive metal comprises further an alloy of tim (Sn) and lead (Pb), which has been coated on the copper surface.

6. The welding method as claimed in claim 4, wherein the electrically-conductive metal comprises further an alloy of tim (Sn) and lead (Pb), which h as been coated on the nickel surface.

7. The welding method as claimed in claim 1, wherein said heat resistant material having good electrical insulating properties comprises a metal whose surface has been subjected to a nitriding treatment.

8. The welding method as claimed in claim 1, wherein said chemical conversion coated layer deposited on the surface of said aluminum foil comprises $Al_2O_3$.

9. The welding method as claimed in claim 8, wherein said chemical conversion layer comprises a layer of $Al_2O_3$ formed to a predetermined thickness of 300 Å.

10. The welding method as claimed in claim 8, wherein said chemical conversion layer comprises a layer of $Al_2O_3$ formed to a predetermined thickness of 300 Å on both sides of said aluminum foil.

* * * * *